Sept. 17, 1946.  A. M. MacCALLUM  2,407,757
MAGNETIC CLUTCH
Filed Dec. 8, 1943
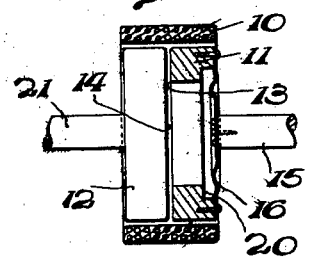
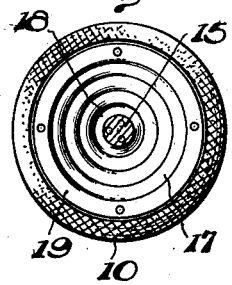
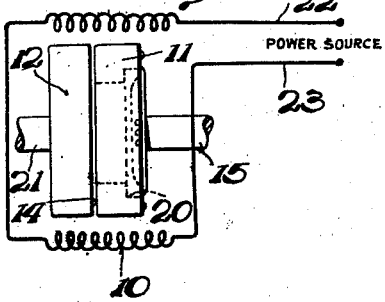
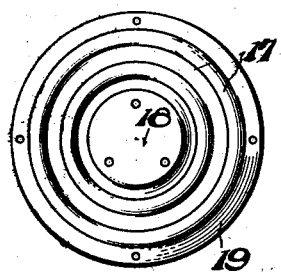
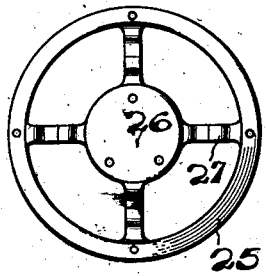
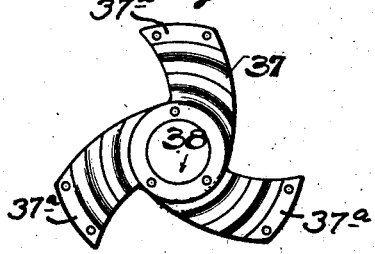
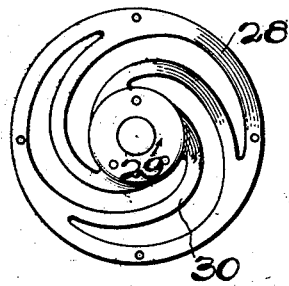
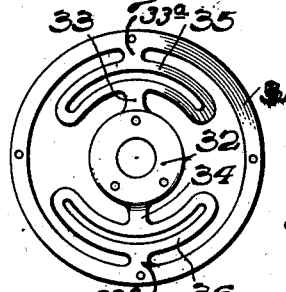
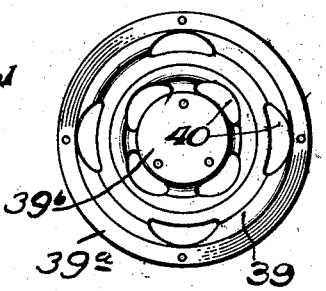
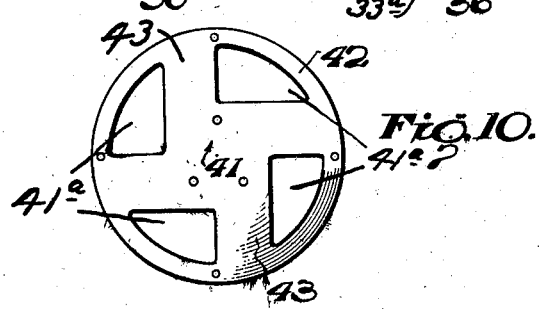
INVENTOR.
Alan M. MacCallum
BY
Herbert M. Birch
ATTORNEY Patented Sept. 17, 1946

2,407,757

UNITED STATES PATENT OFFICE 2,407,757

MAGNETIC CLUTCH

Alan M. MacCallum, Maywood, N. J., assignor to Bendix Aviation Corporation, Teterboro, N. J., a corporation of Delaware Application December 8, 1943, Serial No. 513,421

3 Claims. (Cl. 192—84)

The present invention relates to automatically releasable couplings and particularly to magnetic couplings between drive and driven elements.

Heretofore in the manufacture of magnetic clutches, a coil, to be energized, is carried by the driven clutch face which is usually splined, keyed or otherwise mounted on the drive shaft for longitudinal movement, and is energized from a source of power connected thereto through collector rings and brushes. The collector rings and brushes are subject to wear and corrosion after continued use and exposure to conditions, so that they must be watched and replaced to insure proper actuation of the clutch, while the splined or keyed mounts for the drive face of the clutch, unless they interfit perfectly, will cause lost motion in a radial direction, when the clutch faces are coupled to provide driving torque.

To insure proper clutch actuation independent of such conditions, a novel clutch arrangement is hereby devised, whereby brushes, collector rings, splines, keys and the like are eliminated by fastening the drive clutch member to the drive shaft by a longitudinally flexible member responsive to longitudinal thrust and/or pull to provide for longitudinal shifting of one clutch member to provide for clutching the said driving and driven members together for driving torque without splines or keys. Such an arrangement has particular utility in automatic pilot systems for mobile objects because of its rugged construction and its instantaneous couple, which eliminates lost motion and automatic release action provided for in the drive shaft connection to the clutch face about to be described in detail. Furthermore, because each clutch means is separate and independent of the coil, either may be readily replaced without disturbing the coil as in the prior art.

Accordingly, one object of the present invention is to provide novel means for joining the clutch drive plate with the drive shaft whereby lost motion resulting from worn or poorly machined splines, key connections and the like such as usually used between the drive shaft and the clutch face associated therewith, is eliminated.

Another object of the present invention is to provide a clutch construction, which is relatively simple to manufacture and one in which the clutch plates may be readily demounted and replaced, and which because of its ruggedness and simple construction is particularly suitable and safe for use with automatic pilot systems for aircraft.

Another object is to provide a novel magnetic clutch, whereby brushes, collector rings or the like are rendered unnecessary.

Another object is to provide a novel magnetic clutch including a novel automatic release arrangement.

A further object is to provide a novel improvement in magnetic clutches, whereby a pair of coupling elements are concentrically mounted on drive and driven shafts extending within a stationary coil, so as to thereby automatically release and couple in response to E. M. F. produced in the coil without the use of frictional electric contacts associated with the clutch members or their shaft means.

Another object is to provide in an electromagnetic clutch, a pair of coupling members comprising clutching faces of unlike non-magnetizable material to thereby prevent sticking when the clutch is deenergized.

The above and other objects and advantages of the present invention will appear more fully hereinafter from a consideration of the detailed description which follows, taken together with the accompanying drawing wherein several embodiments of the invention are illustrated. It is to be expressly understood, however, that the drawing is for the purpose of illustration only and is not designed as a definition of the limits of the invention. Reference for this latter purpose should be had to the appended claims.

In the drawing, wherein like reference characters refer to like parts throughout the several views, Figure 1 is a side sectional view of the novel clutch and surrounding coil of the present invention.

Figure 2 is an end view of the structure of Figure 1 looking from the drive shaft toward the spring declutching means.

Figure 3 is a side elevation of the clutch members with a diagrammatic illustration of the coil circuit.

Figure 4 is a plan view of one form of diaphragm or spider designed to provide for declutching the drive and driven members.

Figure 5 is a plan view of another form of spider designed for the purpose of declutching the members.

Figure 6 is a plan view of another form of spider designed for the purpose of declutching the members.

Figure 7 is a plan view of another form of spider designed for the purpose of declutching the members.

Figure 8 is a plan view of another form of spider designed for the purpose of declutching the members.

Figure 9 is a plan view of still another form of spider designed for the purpose of declutching the members.

Figure 10 is a plan view of another form of spider designed for the purpose of declutching the members.

Referring now to the drawing for a detailed description of the present invention, and first with particular reference to Figure 1, numeral 10 represents a coil concentrically mounted around two clutch members 11 and 12, which may be formed of magnetic material of which one or both of the faces 13 and 14 may be of non-magnetic material, preferably unlike material.

Clutch member 11 is connected to the drive shaft 15 through a flexible spring means, such as metallic diaphragm 16.

Diaphragm 16 may include corrugations 17 around a non-corrugated axial center portion 18, riveted, welded or otherwise suitably secured to the end of drive shaft 15, and similarly secured to the back of clutch member 11 at a non-corrugated annular area 19 at its perimeter.

The clutch member 11 is provided with face 13, of non-magnetic material such as aluminum or the like and may be designed as a ring with an annular countersunk portion 20 to allow for any thrust from the drive shaft or flexing of the diaphragm spring 16.

Clutch member 12 is secured to the driven shaft 21, as an integral part thereof or by other suitable means and faces member 11 within the confines of coil 10, which connects through leads 22 and 23, shown in Figure 2, to a suitable power source for energization.

When the coil 10 is energized, movable clutch member 11 is magnetically attracted to longitudinally fixed magnetic clutch member 12, which may if desired have a non-magnetic clutch face 14 preferably of material unlike that of face 13, whereby any sticking from lagging magnetic flux is eliminated. Longitudinal movement of clutch member 11 into engagement with clutch member 12 is made against the resiliency of the flexible spring diaphragm 16, which is moved forward from a normally aligned on center declutched position, so that face 13 of clutch member 11 contacts with fixed clutch face 14 to provide driving couple.

When the coil 10 is deenergized the clutch members are parted by the return action of spring diaphragm 16, which automatically returns to normal on center declutched position.

As shown in the several Figures 4 through 10, numerous forms of diaphragms, spiders or the like for declutching the parts may be provided.

In Figure 4 the spider member comprises a corrugated disc with a level, plane or flat non-corrugated center surface 18 and a level, plane or flat non-corrugated rim or annular area 19 at its perimeter as hereinbefore described. Each surface 18 and 19 may be provided with rivet or screw holes for attachment to the end of drive shaft 15 and the rear peripheral edge of clutch member 11.

In Figure 5 is shown another form of spring disc of wheel-like design including an annular flat rim 25, a central flat hub 26 and a plurality of radially extending corrugated spokes 27.

Figure 6 shows a further form of spring disc, wherein there is provided a flat rim 28, a central annular flat ring 29 and tangentially curving or spiral spokes 30, curving around from the central ring 29, so as to tangentially merge into the outer rim 28.

Figure 7 illustrates another form of disc, wherein there is provided an outer annular flat rim 31, a concentrically mounted apertured inner flat ring 32 with two diametrically opposite or aligned radially extending lugs or arms 33 and 34, each outer end of which is formed into arcuate loops, such as 35 and 36, and centrally merged at each outer portion with the inner edge of the annular rim 31 with lugs or arms 33a.

Figure 8 illustrates a further form of disc, wherein no continuous or annular outer rim is provided, but rather a rim comprising a plurality of spiral or tangentially radiating corrugated arms 37 with spaced segmental or arcuate flat rim sections 37a extending from a centrally apertured annular flat plate 38.

Figure 9 shows still another form of disc construction, wherein a plate 39 having a flat annular rim 39a and a flat central surface or plate 39b, is corrugated therebetween and apertured at desirable points to provide maximum flexing value, such as the half-moon openings 40.

Figure 10 is a further form of disc construction wherein a plate 41 is apertured as at 41a, so as to form a rim 42, with relatively wide off-center spokes 43.

Although several embodiments of the invention have been illustrated and described, other changes and modifications, which will now appear to those skilled in the art, may be made without departing from the scope of the present invention. Reference is, therefore, to be had to the appended claims for a definition of the limits of the present invention.

I claim:

1. In a magnetic clutch having a pair of opposed clutch members adapted to be arranged within a surrounding coil, a driven shaft connected at one end to one clutch member, a drive shaft, the other clutch member being in the form of a ring having a side recess at its inner periphery, and a resilient drive coupling comprising a corrugated plate secured at its central portion to an end of the drive shaft and to one side face of said ring adjacent its perimeter to thereby normally hold said ring clutch member spaced from the other clutch member and through flexing of the plate to permit the clutch members to move together.

2. A magnetic coupling comprising, coaxial drive and driven shafts, opposing clutch members of magnetic material for each of said shafts, one of said members being annular in form, a resilient member having a flat hub portion and a flat peripheral portion, the hub portion being fixed to one of said shafts, the peripheral flat portion being fixed to the outer peripheral face of said annular clutch member, the other of said clutch members being fixed to the other of said shafts; a coil surrounding both of said clutch members, said members being confined within the two planes defined by the outer edges of said coil; and means to energize said coil.

3. A magnetic coupling comprising, coaxial drive and driven shafts, opposing clutch members of magnetic material for each of said shafts, one of said members being annular in form, at least one of the opposing faces of said clutch members being of non-magnetic material; a resilient member having a flat hub portion and a flat peripheral portion, the hub portion being fixed to one of said shafts, the peripheral flat portion being fixed to the outer peripheral face of said annular clutch member, the other of said clutch members being fixed to the other of said shafts; a coil surrounding both of said clutch members, said members being confined within the two planes defined by the outer edges of said coil; and means to energize said coil.

ALAN M. MacCALLUM.